United States Patent
Schauer et al.

[11] Patent Number: 5,941,717
[45] Date of Patent: Aug. 24, 1999

[54] ARRANGEMENT FOR INTRODUCING THE END OF A SHIELDED ELECTRIC LINE INTO A METAL HOUSING

[75] Inventors: Friedrich Schauer, Heroldsberg; Martin Czeschka, Thalmässing, both of Germany

[73] Assignee: Alcatel, France

[21] Appl. No.: 08/898,629

[22] Filed: Jul. 22, 1997

[30] Foreign Application Priority Data

Aug. 2, 1996 [DE] Germany .......................... 196 31 300

[51] Int. Cl.$^6$ ...................................................... H01R 4/66
[52] U.S. Cl. ............................................. 439/98; 439/610
[58] Field of Search ............................ 439/98, 607, 610, 439/460, 932

[56] References Cited

U.S. PATENT DOCUMENTS

| | | |
|---|---|---|
| 3,197,730 | 7/1965 | Hargett . |
| 3,601,524 | 8/1971 | Kauffman . |
| 4,884,981 | 12/1989 | Chandler et al. . |
| 5,127,843 | 7/1992 | Henry et al. . |
| 5,429,529 | 7/1995 | Hashizawa et al. ............... 439/98 X |
| 5,491,766 | 2/1996 | Huynh et al. ..................... 439/98 X |
| 5,618,190 | 4/1997 | Masuda et al. ..................... 439/98 |

FOREIGN PATENT DOCUMENTS

| | | |
|---|---|---|
| 724 310 A2 | 7/1996 | European Pat. Off. . |
| AS 1061859 | 7/1959 | Germany . |
| 24 45 898 A1 | 4/1975 | Germany . |
| 32 42 073 C2 | 1/1988 | Germany . |
| 90 00 794 U1 | 5/1990 | Germany . |
| 715 649 | 9/1954 | United Kingdom . |

*Primary Examiner*—Khiem Nguyen
*Attorney, Agent, or Firm*—Ware, Fressola, Van der Sluys & Adolphson LLP

[57] ABSTRACT

An arrangement for introducing the end of a shielded electric line (2) into a metal housing (1) is indicated. The line (2) has at least one core (6,7) comprising an insulated electric conductor, a flexible metal shield (11) surrounding the core (6,7) and a covering sheath (5) made of an insulating material. The shield (11) with the sheath (5) removed is affixed to a metal clamp (12) which provides a good electrical contact with the housing (1). The clamp (12) is placed inside the housing (1) where the bare conductor of the core (6,7) with the sheath (5) removed is connected via a contact point (8,9) to a component (10) located in the housing (1). After its circumferential surface with the largest radial dimension is bared, the core (6,7) including the conductor and the contact point (8,9) as well as the clamp (12) with the clamped shield (11) are imbedded in an insulator (15). A protective cover (3) made of insulating material is injection-molded around the end of the housing (1) and extends to the line (2) where it is bonded to the sheath (5).

7 Claims, 1 Drawing Sheet

ARRANGEMENT FOR INTRODUCING THE END OF A SHIELDED ELECTRIC LINE INTO A METAL HOUSING

BACKGROUND OF THE INVENTION

1. Technical Field

The invention concerns an arrangement for introducing the end of a shielded electric line into a metal housing, comprising at least one core made of an insulated electric conductor, a flexible metal shield surrounding the core and a sheath made of insulating material which is placed over it, where the shield with the sheath removed is affixed to a metal clamp which provides a good electrical contact with the housing.

Shielded electric lines are used where an undisturbed signal transmission is required. They are used for example to connect electronic devices such as oscillographs, measuring or control instruments. However they can also be connected to any sensors located in metal housings. In that case not only must the line shield be inserted in a trouble-free manner along the entire line, but especially at the insertion point on the respective device. A secure electrical connection between the shield and the housing of the respective device must also be guaranteed.

2. Description of the Prior Art

In the arrangement known from DE 32 42 073 C2, the shield of the line is attached to a metal tube by means of a ferrule which surrounds several cores of the line and is threaded at its open end. The tube can be inserted through an opening in the wall of a metal housing and can be screwed to the latter. The screw connection establishes the contact between the shield and the housing. The end of the line is imbedded in an injection-molded insulator. An O-ring is used to provide a moisture-proof connection between the line and the housing. This effectively protects the line insertion point in the housing against moisture. However if the sheath of the line is damaged, moisture entering the line can also enter into the housing.

SUMMARY OF THE INVENTION

It is an object of the invention to further develop the above-mentioned arrangement so that no moisture is able to enter the inside of the housing through the line insertion point on the housing. This object is fulfilled by the invention in that:

- the metal clamp is placed inside the housing where the conductor of the core, with the sheath removed, is connected to a contact point on a component located inside the housing,
- after baring its circumferential surface with the largest radial dimension, the core including the conductor and the contact point as well as the clamp with the clamped shield are imbedded in an insulator, and
- a protective cover made of insulating material is injection-molded around the end of the housing and extends to the line where it is bonded to the sheath.

This arrangement guarantees a fully moisture-proof connection between a shielded electric line and a metal housing, as well as an effective through-connection for the line shield. The outer protective cover which is bonded to the line sheath seals the connection point of line and housing from the outside. Any moisture which has possibly entered into the line cannot enter into the housing; it is blocked by the insulator surrounding the core and the shield. The clamp which is located inside the housing provides a good through-connection for the shield of the line.

The invention will be fully understood when reference is made to the following detailed description taken in conjunction with the accompanying drawing.

DETAILED DESCRIPTION OF THE INVENTION

Figure 1:
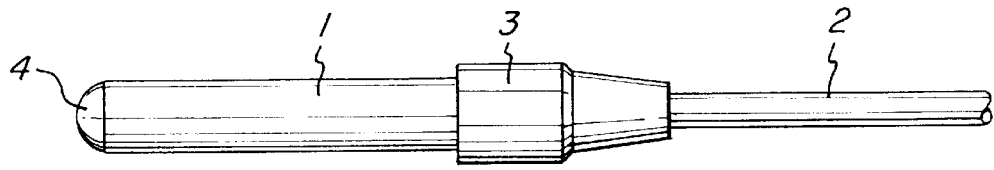
FIG. 1 is a schematic illustration of an arrangement according to the invention.
Figure 2:
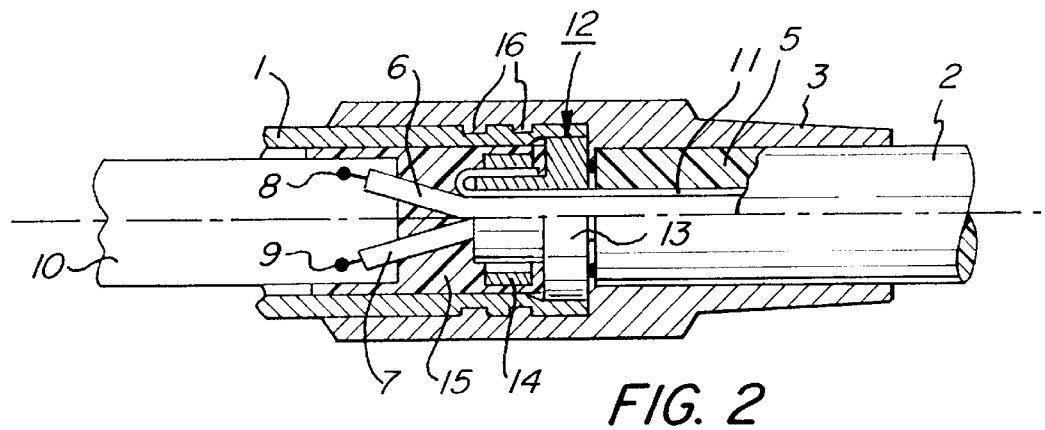
FIGS. 2 and 3 are two different enlarged cross sectional views of a portion of FIG. 1.

FIG. 1 illustrates a tubular metal housing 1 with a shielded electric line 2 inserted into one end. This end of the housing 1 is surrounded by a protective cover 3 which extends to the line 2. A sensor 4 is installed at the other end of the housing 1 for example, and is connected to the line 2 via interconnections with electric or electronic components. The line 2 has at least one core including an insulated conductor surrounded by a sheath 5 (FIG. 2). The line 2 preferably contains several cores.

Figure 3:
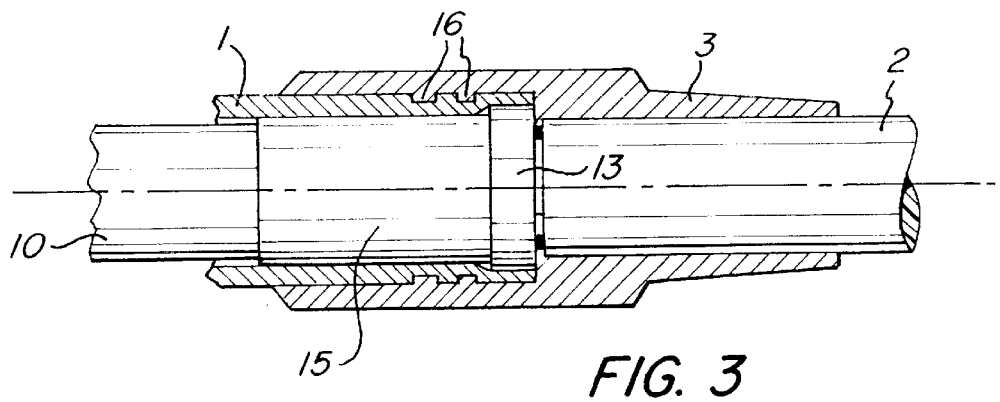

The line 2 in the configuration example illustrated in FIGS. 2 and 3 has two cores 6 and 7. At contact points 8 and 9, its bare conductors are connected to a component 10, which is for example a printed circuit board containing conduction paths and electronic components. The shield 11, which is bare after the sheath 5 of line 2 has been removed, is bent back and secured in a metal clamp 12. The clamp 12 is made of a base 13 with a conical extension and a ring 14 with the shield 11 clamped between them. The base 13 has the largest radial dimension of the clamp 12. It is secured to the housing 1. In this case, the internal geometric form of the housing 1 is preferably equal to the outer geometric form of the base 13. The base 13 is therefore cylindrical in a circular housing 1. The cores 6 and 7, the contact points 8 and 9, the end of the shield 11 which is bent backwards and the area of the ring 14 of clamp 12 are imbedded in an insulator 15. In the preferred configuration, the shield 11 is made of braided copper wires.

The insulator 15, which is preferably made of moldable plastic resin such as polyurethane, is designed so that it can be inserted without difficulty into the housing 1. To consider potential thermal expansion at higher temperatures, the outside dimensions of the insulator 15 are smaller than the internal dimensions of the housing 1. FIG. 3 illustrates the insulator 15 not in cross-section. The circumference of the clamp 12 with the largest diameter, namely the circumference of the base 13, is free of the insulator 15 material and is therefore bare metal. In the finished arrangement, it is affixed to the housing 1 and thereby provides a good electrical contact with same. The shield 11 is thereby connected to the housing 1 in a good electrically conductive manner. At least one circumferential crimp 16 can be provided on the outside of the housing 1, which improves the connection between the protective cover 3 and the housing 1. The illustrated example contains two crimps 16.

The arrangement illustrated in FIGS. 1 to 3 is produced for example as follows:

A predetermined length of the sheath 5 is removed from the end of the electric line 2. The base 13 of clamp 12 is pushed over the thus bare shield 11. The end of the shield 11 is then bent backwards until it lies against the conical extension of the base 13 and is securely clamped by the ring 14.

Subsequently, the insulation is removed from the conductors of cores 6 and 7, which are connected to the component 10 in an electrically conductive manner via contact points 8 and 9. The insulator 15 is formed around the thus prepared line end including the clamp 12 and the component 10. To that end, a mold which includes a tube-shaped component and serves to provide a mold cavity is arranged for example around the line end; one end of the mold lies against the base 13 of the clamp 12. The mold produced in this manner is then vertically filled with insulation material, for example polyurethane, until the entire space surrounded by the tube-shaped component is filled. The tube-shaped component, as well as any other component used to provide the mold cavity, can then be removed. However, a tube-shaped component made of a suitable material could also be left in the insulator 15.

As already mentioned, the insulator 15 is shaped to suit the inner contour of the housing 1. Basically the insulator 15 could also have a different geometric form as long as the end of the line 2 is closed in a moisture-proof manner and as long as the possibility for thermal expansion is provided.

The end of the line 2 with the insulator 15 and the connected component 10 is pushed into the housing 1 until it assumes the position shown in FIGS. 2 and 3. In this position, the base 13 of the clamp 12 lies tightly against the housing 1. The connection of these two parts can still be improved by means of an external force on the housing 1, for example by pressure.

Finally, the protective cover 3 is injection-molded around the end of the housing 1 and the line 2 protruding from same. A material that bonds to the sheath 5 of line 2 is used. Such a material is polyurethane for example. The secure attachment of the protective cover 3 to the housing 1 is supported by the crimps 16.

The preferred embodiment described above admirably achieves the objects of the invention. However, it will be appreciated that departures can be made by those skilled in the art without departing from the spirit and scope of the invention which is limited only by the following claims.

What is claimed is:

1. Arrangement for introducing an end of a shielded electrical line into a metal housing, the arrangement comprising:

(a) a shielded electrical line having at least one core composed of an electric conductor with insulation therearound, a flexible metal shield surrounding the at least one core and a sheath made of insulating material placed thereover, at an end of the electrical line, the sheath is removed from a portion of the shield and the insulation from an end portion of each electrical conductor is removed;

(b) a metal clamp affixed to the portion of the shield with the sheath removed, the metal clamp having a central part and a greatest dimension defining a peripheral portion;

(c) a component connected to the end portion of each electrical conductor with the insulation removed via a contact point;

(d) an insulator imbedding the portion of the shield with the sheath removed, the end portion of each electrical conductor with the insulation removed, each contact point and the central part of the metal clamp while the Peripheral portion of the metal clamp is left uncovered by the insulator;

(e) a metal housing surrounding the insulator and having the component and the metal clamp therewithin, the metal housing being electrically connected to the metal clamp at the peripheral portion, which completely contacts the metal housing; and (f) a protective cover made of insulation material, the protective cover molded around an end of the metal housing and the shielded electrical line extending therefrom, the protective cover being bonded to the sheath of the shielded electrical line.

2. Arrangement as claimed in claim 1, wherein the insulator is spaced from the metal housing to allow for thermal expansion of the insulator.

3. Arrangement for introducing an end of a shielded electrical line into a metal housing, the arrangement comprising:

(a) a shielded electrical line having at least one core composed of an electric conductor with insulation therearound, a flexible metal shield surrounding the at least one core and a sheath made of insulating material placed thereover, at an end of the electrical line, the sheath is removed from a portion of the shield and the insulation from an end portion of each electrical conductor is removed;

(b) a metal clamp affixed to the portion of the shield with the sheath removed, the metal clamp comprises a base with a conical extension and a ring which is pushed over the extension;

(c) a component connected to the end portion of each electrical conductor with the insulation removed via a contact point;

(d) an insulator imbedding the portion of the shield with the sheath removed, the end portion of each electrical conductor with the insulation removed, each contact point and the metal clamp;

(e) a metal housing surrounding the insulator and having the component and the metal clamp therewithin, the metal housing being electrically connected to the metal clamp; and (f) a protective cover made of insulation material, the protective cover molded around an end of the metal housing and the shielded electrical line extending therefrom, the protective cover being bonded to the sheath of the shielded electrical line.

4. Arrangement as claimed in claim 1, wherein the metal housing has at least one crimp on its external surface and the protective cover extends over the at least one crimp to mechanically connect the metal housing and the protective cover.

5. Arrangement as claimed in claim 1, wherein the metal clamp comprises a conical extension and a ring which is pushed over the extension.

6. Arrangement as claimed in claim 1, wherein the insulator is made of a plastic resin.

7. Arrangement as claimed in claim 6, wherein the plastic resin is polyurethane.

* * * * *